US009607302B2

(12) United States Patent
Dixon et al.

(10) Patent No.: US 9,607,302 B2
(45) Date of Patent: Mar. 28, 2017

(54) REMOTELY CONFIGURING CONTENT

(75) Inventors: Chris Dixon, Merion Station, PA (US);
Jason Smith, Orwigsburg, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 957 days.

(21) Appl. No.: 13/155,940

(22) Filed: Jun. 8, 2011

(65) Prior Publication Data

US 2012/0315008 A1    Dec. 13, 2012

(51) Int. Cl.
| | |
|---|---|
| *H04N 5/775* | (2006.01) |
| *G06Q 30/00* | (2012.01) |
| *H04N 21/433* | (2011.01) |
| *H04N 21/472* | (2011.01) |
| *H04N 21/482* | (2011.01) |
| *H04N 21/485* | (2011.01) |
| *H04N 21/81* | (2011.01) |
| *H04N 21/4227* | (2011.01) |

(52) U.S. Cl.
CPC ......... *G06Q 30/00* (2013.01); *H04N 21/4227* (2013.01); *H04N 21/4334* (2013.01); *H04N 21/472* (2013.01); *H04N 21/482* (2013.01); *H04N 21/485* (2013.01); *H04N 21/812* (2013.01)

(58) Field of Classification Search
CPC ........ H04N 5/775; H04N 5/85; H04N 9/8042; G11B 27/34; G11B 27/105
USPC ...................................................... 386/230
See application file for complete search history.

(56) References Cited

U.S. PATENT DOCUMENTS

| | | | |
|---|---|---|---|
| 2004/0215509 A1* | 10/2004 | Perry ............................... | 705/14 |
| 2009/0241150 A1* | 9/2009 | White et al. .................... | 725/91 |
| 2009/0310937 A1 | 12/2009 | Ellis et al. | |

FOREIGN PATENT DOCUMENTS

WO     03/054679 A1    7/2003

OTHER PUBLICATIONS

Part 1: Third Party Ad Serving Basics, by Google: http://www.youtube.com/watch?v=prh9kf1Jbmw. Last visited Jun. 8, 2011.

(Continued)

*Primary Examiner* — William C Vaughn, Jr.
*Assistant Examiner* — Daniel Tekle
(74) *Attorney, Agent, or Firm* — Banner & Witcoff, Ltd.

(57) ABSTRACT

A system is presented that comprises a third-party ad provider that serves advertisements to different websites being viewed at a plurality of display devices. The advertisements may be from different advertisers, and may include advertisements from a content service provider. The advertisements from the service provider may include a promotion for a video program presented by the service provider and may provide a selectable option for a viewer of the website to have that viewer's DVR service automatically programmed to record the promoted video program. The selectable option may be selected with a single action by the viewer, and all communications, associations between the display device and the DVR service, and programming of the DVR service may occur automatically without intervention by the viewer.

20 Claims, 11 Drawing Sheets

(56) References Cited

OTHER PUBLICATIONS

Part 2: Third Party Ad Serving Basics, by Google: http://www.youtube.com/watch?v=SeOD8QXDi2Q. Last visited Jun. 8, 2011.
Part 3: Third Party Ad Serving Basics, by Google: http://www.youtube.com/watch?v=Np2da3FND8Y. Last visited Jun. 8, 2011.
Eureopean Search Report—EP 12171051—Mailing date: Aug. 30, 2012.

\* cited by examiner

REMOTELY CONFIGURING CONTENT

BACKGROUND

Content providers enable users to remotely schedule and control their consumption of entertainment, such as via control of devices such as set top boxes and digital video recorders, via a network using a web browser or other software application. As content and services have evolved, the remote scheduling and control mechanisms continue to operate under a "discovery" model, in which a viewer must "discover" content through searching program guide grids, search-by keyword, navigation of thumbnails, etc.

These solutions do not offer sufficient opportunity for content producers, aggregators, owners, or providers to drive awareness and/or traffic through advertising. Advertising falls short in that it does not aid the user in consuming the content, and in other areas.

SUMMARY

This Summary is provided to introduce a selection of concepts in a simplified form that are further described below in the Detailed Description. This Summary is not intended to identify key features or essential features of the disclosure.

In various embodiments, methods and systems enable web-based advertising to control a gateway, set top box or other consumer electronic device. Specifically, a user connected to a network such as the internet, via a computer or other device, may view a content page, such as a webpage or other content, which includes a web advertisement. That user may also coincidentally be a user of a service provider (e.g., subscriber to a cable company). Through information stored on the user's display device on which the user views the content page, or associated device, the provider of the web advertisement may be made aware of the user's service provider account and the settings and features associated with the account. Using the discovered information, the provider may tailor an advertisement on the content page and provide interactive functionality to control the user's account settings and functions.

For example, in one embodiment, an advertiser may be a third-party ad provider who presents advertisements via an ad server on various websites which are hosted by different publishers and which provide content via each publisher's server. The publisher may contract or have an agreement with the third-party ad provider, and may redirect the user's computer to retrieve or receive the advertisements from the third-party ad provider's server, rather than from the publisher's server. The third-party ad provider in turn may host and serve a number of different advertisements and advertisers. The advertisement presented for the advertiser by the third-party ad provider may include promotions for services provided by the advertiser.

The advertiser, for example, may be a service provider, such as a network operator (e.g., Comcast), or a video content provider, such as a broadcast channel company (e.g., NBC, HBO, etc.). The advertisement may promote a new television series. In addition to simply providing a promotion of the series, if the viewer of the advertisement is a user of the particular provider, the advertisement may also include interactive features that are tied to the services provided.

In one aspect, the viewer of a content page (e.g., webpage) advertisement may be a user or customer of a video service provider, which provides a DVR service to the user. The service may include the capability for the video service provider to remotely program or schedule recordings on the user's DVR, or record the program at the video service provider and store the recording in a recording library assigned to the user. In such a case, if the third-party ad provider can discern that the viewer of the content page advertisement is also a customer/user of the video service provider (i.e., the advertiser), an interactive feature may be added to the content page advertisement. When selected by a viewer of the content page, the interactive feature can cause the advertised series to be automatically recorded (e.g., without further input or action by the viewer). Alternatively, when selected by a viewer of the content page, the interactive feature can cause the viewer's DVR to be programmed automatically to record the advertised series. In various embodiments, the third-party ad provider determines that the viewer of the advertisement is a user of the advertiser's service via information gleaned from the computer on which the content page is displayed. These and other embodiments are discussed below.

DETAILED DESCRIPTION

Figure 1:
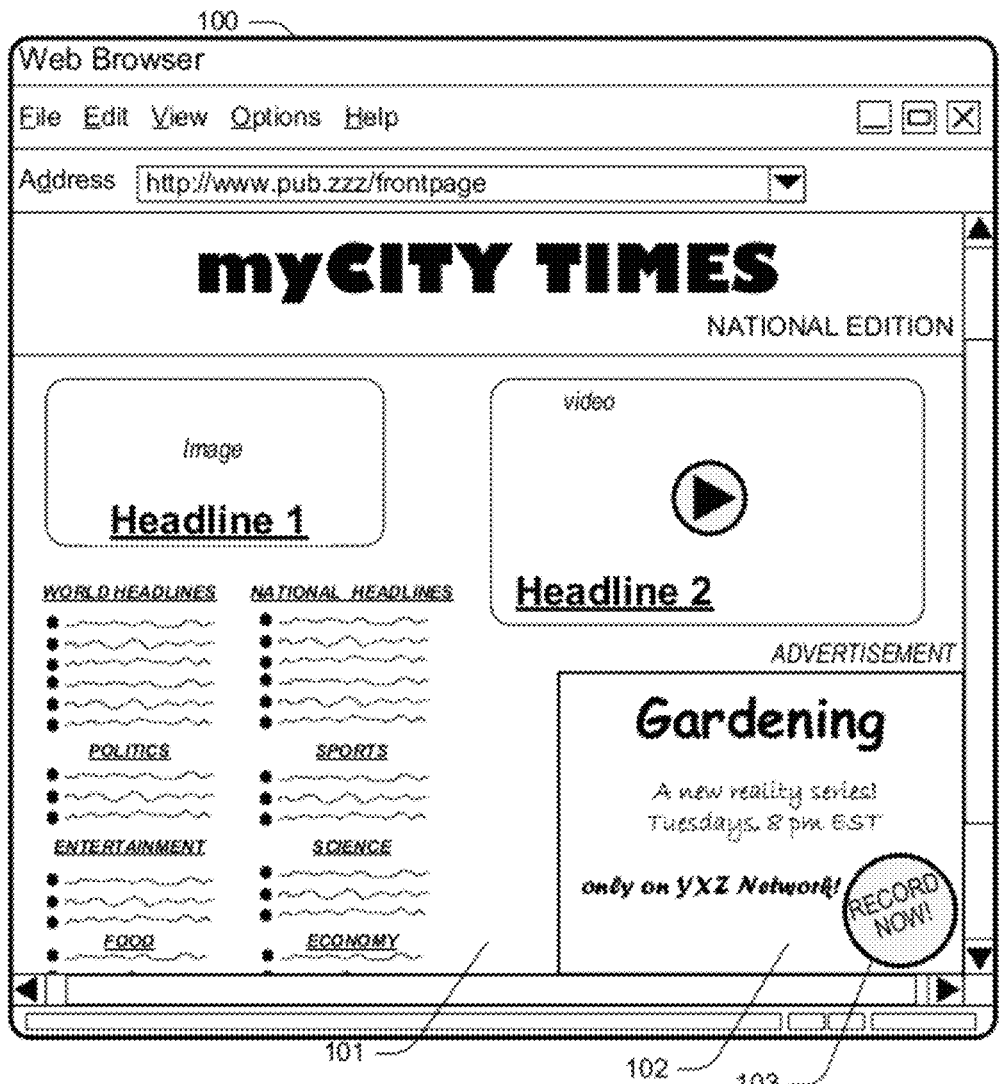
FIG. 1 includes a browser display according at least one illustrative embodiment.

FIG. 1 illustrates a display page 100 navigated to by a browser according to various embodiments. Web browser 100 may be any commercial or custom software application running on a personal computer or other device capable of accessing content on any public or private network (e.g., the internet). The content may be encoded in HTML, JavaScript, Flash-based, or other format suitable for display and interaction. For example, a user may input a web address into the address bar of browser 100 (e.g., www.pub.zzz/FrontPage), and in response, the browser 100 may display a content page (e.g., webpage) retrieved from that address. In this example the content page is a news website, titled "myCity Times," which has been retrieved from a publisher's web server. The content page may include a content frame 101, which includes titles and other content, which the publisher wishes to present, and an advertising frame 102. For example, the content frame 101 includes the headlines "world headlines," "politics," "entertainment," food," "national headlines," "sports," "science," and "economy." Each headline may be a static text display or may be a hyperlink to other web pages. The content page 101 may also include articles, article titles that may be hyperlinks to articles, images such as the image titled "Headline 1," and videos such as the video titled "Headline 2." While a news website is illustrated in browser 100, the content page including content frame 101 may include any content, which the publisher wishes to provide.

Advertising frame 102 may include an advertisement provided-by/retrieved-from the publisher's server or from a third-party advertising server and the advertisement may be interactive and/or targeted to a specific user or group of users. In the example of FIG. 1, the advertisement frame 102 displays an advertisement for a new video program on the YXZ network. The new video program is called "Gardening," which the advertisement describes as a new reality series broadcast on Tuesdays at 8 p.m. Eastern Standard Time. The advertisement may be targeted to a user or group of users for example based on demographic data, geographic data of the user, browsing habits of the user, or other information which is discernible from the interaction of the user with the current content page or with other content pages on which the third-party advertiser presents advertisements.

In various embodiments, the third-party advertising server may present the advertisement for a video content provider, such as a television network (e.g., HBO, ESPN, etc.) or for a video service provider such as a cable, broadcast, satellite, internet or other broadcast company, which provides video programming (e.g., Comcast, Cox, etc.). Although the advertisement may be targeted to a specific user or group of users based on, for example demographic data, the third-party advertiser may not be aware that the user visiting the page is also a customer of the company or group placing the advertisement. For example, the user/viewer of the content page may be a customer of service provider, SP, and the advertiser may be the YXZ network, which is carried as a regular service, or offered for an additional fee, to customers by service provider, SP.

As a customer of service provider SP, or another content provider, the user may be provided relevant features/services such as digital video recording (DVR), remote DVR, video on demand, and other such services provided by video service providers. Through retrieval and display of the advertisement in advertising frame 102, and the user's interaction with the advertisement, the advertiser or third-party advertisement provider may be made aware of the user's video service provider account and the settings and features provided by the account. Using the discovered video service account information, the advertisement provider may tailor the advertisement and provide interactive functionality to control the user's video service account settings. For example, the advertisement provider may include a "record now" icon/text/button 103, which is an interactive control that when selected by the viewer, automatically configures (i.e., without further action by the viewer and/or other person) the user's digital video recording service provided by service provider SP to record the advertised series "Gardening" available on the YXZ network. The selectable icon/text/button in the web advertisement may receive just a single selection or action from the user at the computing device displaying the webpage, to cause the automatic configuration of other equipment such as a digital video recorder (DVR), which is associated with the video service. Automatic programming of a DVR is just one example, and other embodiments may include the automatic configuring of a user's other video service features through interaction with an advertisement displayed in a webpage. Functions and actions (e.g., programming, configuring, changing, etc.), which are autonomous or automatic, are performed by a computer or other equipment (e.g., equipment 1000) wholly or partially without direction, input, intervention, or control by the viewer, user, or other human being.

While the content page in FIG. 1 is shown with one content frame and one advertisement frame, in other embodiments, the content page may contain any number of content frames and advertisement frames.

In certain variations, one or more servers over one or more networks may automatically perform all communications, and processing to associate the user's interactions with the advertisement at the computing device and the user's video service, and configuration of the video service equipment without intervention by the user. This is so even though there may be no direct link between the computing device, which displays the webpage, and the equipment associated with the video service, or other provided service. That is to say, the user's computing device need not be connected to the same network on which the video service is provided to the user.

Figure 2:
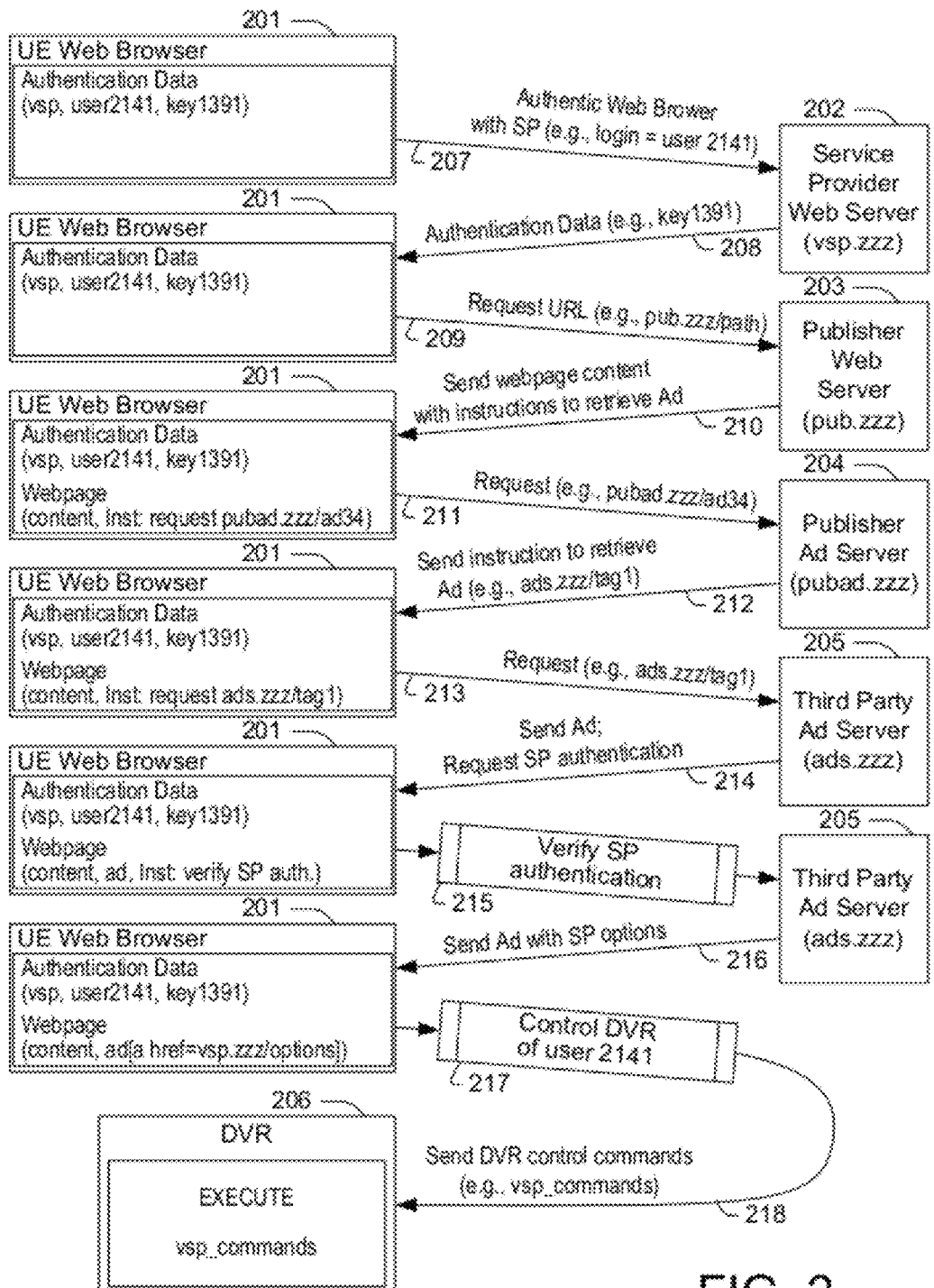
FIG. 2 illustrates a communication flow chart according to some illustrative embodiments.

FIG. 2 illustrates a communication flow in which certain variations may be performed. FIG. 2 begins at user equipment 201 displaying information, such as a content page as shown in FIG. 1. Prior to viewing or accessing the web page, the user may have previously used the browser on user equipment 201 to login to the provider's website where the user may, for example, have the ability to remotely control the user's digital video recorder (DVR) services. For example, the previously discussed provider SP may provide the user the capability to see and configure the recording schedule of its DVR through the provider's website. To do so, the user may have to log into a personal account on the provider's website by providing in a communication 207, a password and username, or providing some other authentication data. As one example, the user may enter a user ID of "user2141" and a password into appropriate fields of a login page of the provider's website, to verify that the user is authorized to remotely control the service. After the user enters the data, user equipment 201 transmits the login data or other authentication data to the video service provider's web server 202. In response, video service provider web server 202 may authenticate the user based on the received authentication data and send back to user equipment 201 authentication data in a communication 208, such as a cookie or other data (e.g., "key 1391"). The new authentication data may then be stored at user equipment 201, and automatically provided in every subsequent visit to the video service provider web server 202 to indicate that user equipment 201 has previously been authenticated with the video service provider. The authentication data may be persistent, such that the authentication never expires on the user equipment or may expire after a set period of time.

After user equipment 201 has been authenticated, a user may use the web browser (or any network browser) to visit another website. For example, the user may visit a publisher's website by sending a request 209 for a webpage to URL "www.pub.zzz," which is hosted by the publisher's web server 203. In response to the request 209, the publisher's web server 203 may serve, in one or more response communications 210, webpages including content such as the one displayed in FIG. 1 or including any other content. The publisher's webpages may also include one or more advertisement frames such as the advertisement frame 102 of FIG. 1. The webpage content may be accompanied by instructions for the browser to retrieve advertisements to be populated in the one or more advertisement frames.

The instructions, for example, may direct the browser and/or user equipment 201 to request an advertisement from the publisher's ad server 204 (e.g. pubad.zzz/ad34). The request 211 may specify a particular advertisement, a type of advertisement (e.g., related to sports, technology, etc.), or may simply be a generic request for an advertisement. In response to the request 211, the publisher's ad server 204 may select a particular advertiser, or advertisement category, from an inventory of advertisers or categories to place in the one or more at frames of the requested webpage. In certain variations, the publisher may do so based on the publisher's ad server measuring the performance of different advertisements on the publisher's website from different advertisers.

The publisher, via the publisher's ad server 204, for example, may provide a webpage/information including sports news, and based on the webpage content, may automatically select an advertiser, from a pool of advertisers that provide sports related merchandise or services. Based on this selection, the publisher's ad server (or another computing device) 204 sends instructions in a communication 212 to the browser on user equipment 201 to retrieve an advertisement from a third-party ad server 205, with the address of the third party ad server and the advertisement identified by a tag or other metadata included in the communication 212. In response to receiving the instructions, the browser on user equipment 201 sends a request in a communication 213 to the third-party ad server's URL (e.g., ads.zzz), including the tag or other metadata identifying the requested advertisement (e.g., tag 1). The tags or other metadata provided by the publisher ad server 204 may be interpreted by the third-party ad server 205 to identify a particular advertisement within the ad server's advertisement inventory.

The tags, for example, may be originally generated by the third-party ad server to reflect its inventory of advertisements acquired from different advertisers 219 (not shown in FIG. 2). The third-party ad server then may provide the tags to the publisher's ad server, and the publisher's ad server may store inventories of advertisement tags from different third-party ad servers. By storing and providing only tags or other metadata to the browser on user equipment 201, the third-party ad provider may change and update the advertisements associated with the tags in the third party ad server 205, without the publisher having to modify its inventory.

Once the third-party ad server 205 receives a request for the advertisement with the tag information included, third-party ad server 205 selects an advertisement associated with the tag from its inventory and sends it in a communication 214 to the user equipment 201 to be displayed in the advertisement frame of the webpage.

In a variation to this example, communications 211, 212, 213, and 214 may be combined or modified so that the browser on user equipment 201 requests the advertisement directly from the third-party ad server 205, or so that the publisher ad server 204 provides the advertisement directly to the user's browser and/or user's equipment 201.

The advertisement sent may, for example, be a promotion, such as the one shown in advertisement frame 102 in FIG. 1, for the provider SP, or for a video content provider (e.g., YXZ network). In such an example, the advertisement may be interactive such that the viewers of the advertisement at user equipment 201, who are also customers of the provider SP, are enabled to control their video services provided by the provider SP through interaction with the advertisement.

For such advertisements, the third-party ad server 205 may send a request 214 to the browser on user equipment 201 to determine if the user equipment has ever previously been, and/or is currently, authenticated with the service provider, or if a user of user equipment 201 is otherwise a user or customer of the service provider. In response to request 214, the browser on user equipment 201 may perform a verification 215 with the third-party ad server 205 to confirm the user equipment's prior the authentication. Once confirmed, third-party ad server 205 may modify the advertisement, or send a new advertisement, which includes interactive options specific to that user's services in communication 216. One such option may for example be an interactive selection option that the user may choose, which automatically sets the user's DVR 206 to record the show, series, related subject matter, or other audiovisual content related to the advertisement.

If the user selects the presented option in the advertisement, the browser or another application on user equipment 201 may send a communication 217, which may result in the remote control/programming of the user's DVR 206, via one or more commands 218 sent to DVR 206. DVR 206 may be an electronic appliance located within the home of the user, or maybe a DVR service remotely located at the video service providers facility (e.g., network DVR) or other remote facility. It will be appreciated that rather than a DVR being located at the user premises, the video content server can provide the recording functionality and provide the user access to the content via a user's program library.

Figure 3:
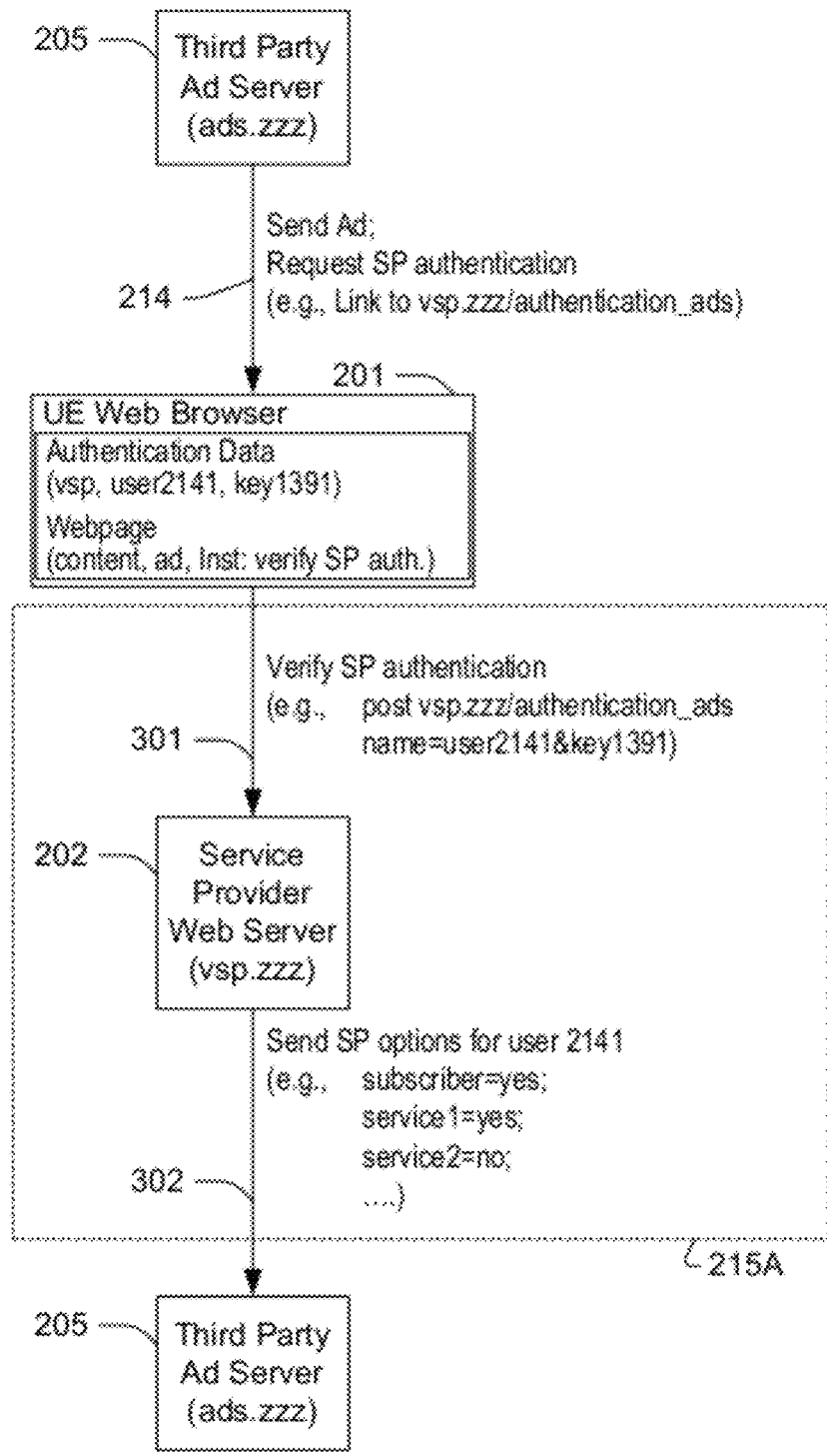
FIGS. 3-6 illustrate detailed flowcharts of the verification in FIG. 2 according to various illustrative embodiments.

FIG. 3 illustrates one example of verification 215 (e.g., 215A) performed in FIG. 2. In the example of FIG. 3, the third-party ad provider and the service provider may have a prearranged agreement, process, or system, by which the service provider provides authentication data to the third-party ad provider. Prior to the verification 215A, the provider's authentication request 214 sent by the third-party ad server 205 may include a link to the provider's web server 202 (e.g., www.vsp.zzz), and include a path that is specific to or associated with the third-party ad server (e.g., /authentication_ads). For example, the link in communication 214 could include the complete URL, www.vsp.zzz/authentication_ads. After receiving authentication request 214, the browser on user equipment 201 may start the verification 215A by sending a communication 301, which posts the user ID and previously acquired verification data associated with the user's service provider account to the provided service provider link. Note that in this example, the user equipment sends information to the video service provider (and not the third-party ad server), so that the video service provider authentication data remains secure and does not get provided to outside parties (e.g., the third-party ad provider).

The service provider link (e.g., www.vsp.zzz/authentication_ads) provided in communication 301 may be mapped to the service provider's web server 202 or other computing device associated with the service provider. The video service provider receiving this information at the path associated with the particular third-party ad server 205 (i.e., authentication_ads) may interpret the posting of this data to indicate that the user equipment 201 has received a customizable advertisement from the identified third-party ad provider, and that the user equipment 201 is associated with the service provider user identified by ID user2141 (e.g., the user equipment may be owned or used by the account holder with the user ID). The service provider may have agreements with a number of different third-party ad providers and may have a different path mapped for each one (e.g., authentication_ads1, authentication_ads2, etc.). Alternatively, the service provider may have one or more general paths to which communication 301 is sent, and the third party ad server may be identified by other data within communication 301.

Based on the arrangement, process, or system between service provider SP and the third-party ad provider, service provider web server 202 completes verification 215A, by automatically sending in a communication 302 to the third-party ad server 205 options to be displayed in the advertisement, which are particularly associated with the user's service provider account (e.g., user2141). For example, the options may indicate that the user of the browser on user equipment 201 is a subscriber to the service provider and receives (or does not receive) various optional services provided by the service provider. For example, communication 302 may indicate that user2141 has two remotely programmable digital video recorders, subscribes to a particular channel from a video content provider (e.g., YXZ Network), but does not subscribe to a channel from another video content provider (e.g., HBO network). From these options, third-party ad server 205 may determine how to customize the advertisement to target this particular user of the service provider or to provide value added services associated with service provider and/or the YXZ network.

For example if the user is a customer or user of the service provider and subscribes to the YXZ network, the advertisement may be modified or replaced to provide the user with a selectable option (i.e., a button) to record the video programming (e.g., "Gardening") promoted in the advertisement of FIG. 1. In another example, if the user is a customer of the provider, but does not subscribe to the YXZ network, the advertisement may be modified to offer the user an option to automatically join or subscribe to the YXZ network through the service provider SP. In a different example, the user may be a customer of the service provider SP and a subscriber to the YXZ network, and may have already scheduled the recording of the advertised program or series on the user's DVR. Based on the user's interests in the advertised program indicated by the already scheduled recording, the third-party ad server 205 may automatically modify the advertisement to offer other programs with related content, or otherwise target the advertisement to the user's preferences based on the already scheduled recording. In yet another example, if the user is not a subscriber to service provider the advertisement may provide an option to subscribe to service provide or provide a link to the service provider's server, at which the user may subscribe to service provider. The above embodiments are only examples, and various other embodiments may include any combination or modifications to these examples.

The third-party ad provider may have a relationship, agreement, process or system in place with more than one video service providers from which the video content provider (e.g., YXZ network) is accessible. In such a case, the service provider authentication request 214 may include links to a number of different video service providers, and the user equipment 201 may send one or more different communications 301 to the links of the different video service providers. The video service providers which receive a communication 301 in which the user does not have an account may simply ignore the communication. The video service provider(s) with which the user does have an account, however, may recognize that the communication comes from a current customer, and as a result, may send the communication 302 to the third-party ad server indicating that the user has an account with that video service provider.

Figure 4:
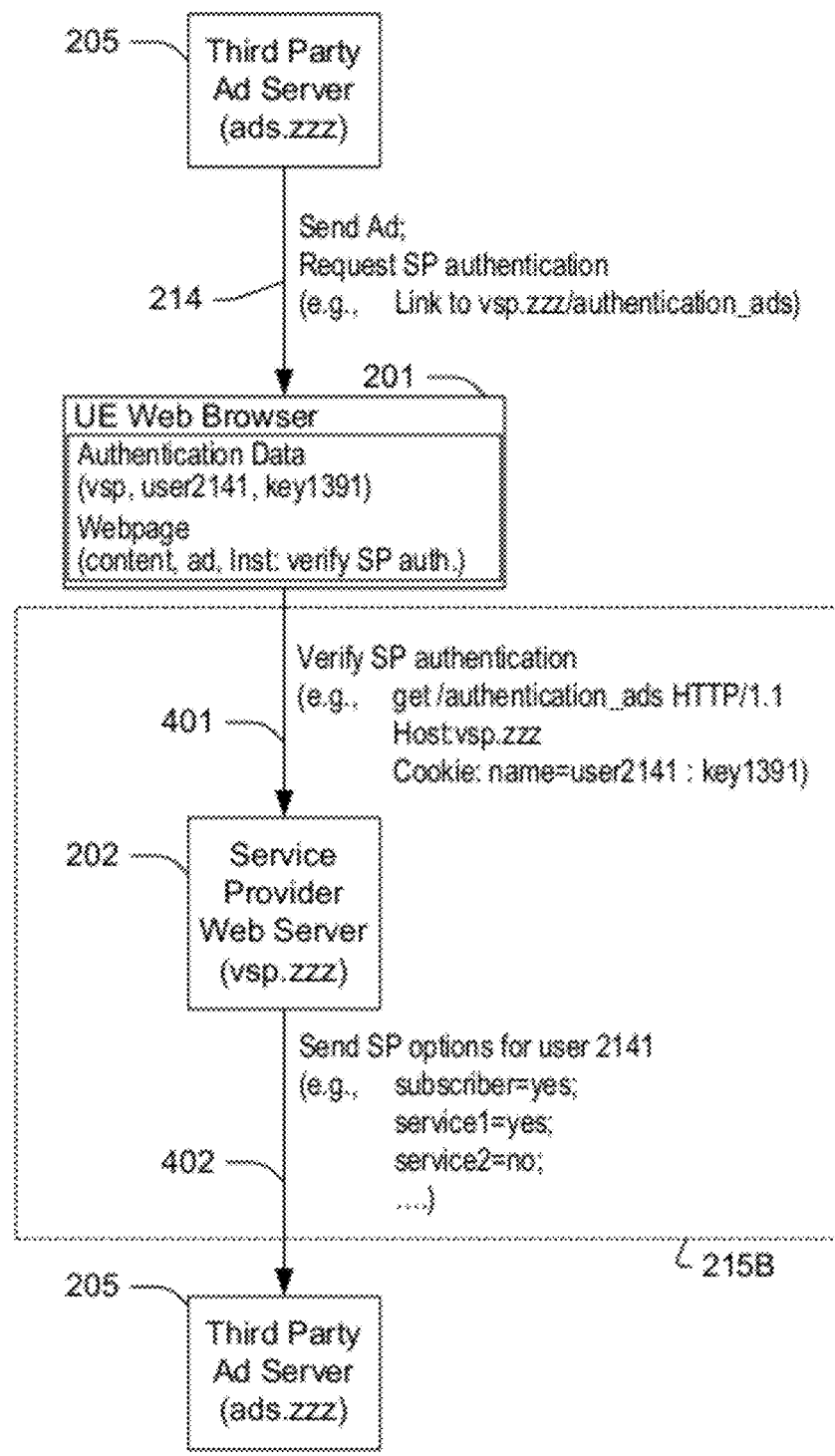

FIG. 4 illustrates another example embodiment of the service provider authentication 215 (e.g., 215B) illustrated in FIG. 2. In FIG. 4, the service provider authentication request 214 is the same as that illustrated in FIG. 3, which may include a link to the video service provider web server 202. Recall from FIG. 2 that the browser on user equipment 201 may have been previously authenticated, and may have received a cookie from the video service provider web server 202 in communications 207 and 208. In the example of FIG. 4, in response to receiving the request 214, the browser on user equipment 201 begins verification 215 by sending a communication 401 to the video service provider web server (e.g., get/authentication_ads HTTP/1.1 Host: vsp.zzz). Since the link provided in communication 214 is to the same URL that may have provided the original cookie, communication 401 may also automatically include the cookie (e.g., Cookie: name=user2141:key1391) in the response. The video service provider web server 202 can then use the responded cookie as the authentication data and proceed to send communication 402 to the third-party ad server 205 in the same manner discussed above with respect to FIG. 3.

Figure 5:
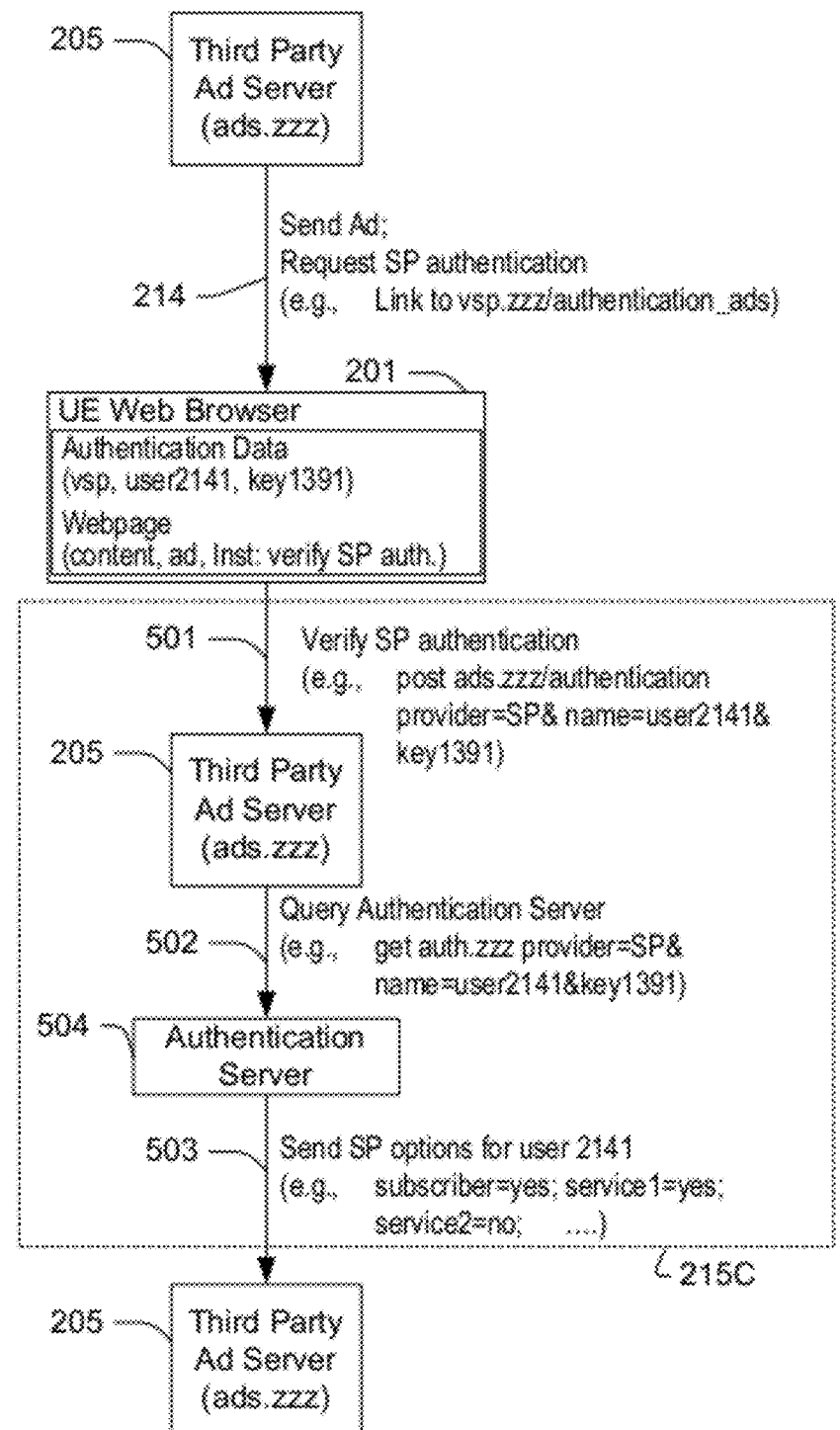

FIG. 5 illustrates yet another embodiment of the service provider authentication 215 (e.g., 215C) illustrated in FIG. 2. The request for service provider authentication 214 sent by the third-party ad server, again, is the same as those in FIGS. 3 and 4. However, in the example of FIG. 5, the verification of service provider authentication 215C, begins by the browser on user equipment 201 sending authentication data directly to the third-party ad server 205 instead of to the video service provider web server (e.g., post ads.zzz/ authentication provider=vsp& name=user2141 &key1391). The third-party ad server 205 may then query an authentication server 504 in a communication 502. Authentication server 504 may be the video service provider web server (e.g., vsp.zzz), may be a separate authentication server hosted by the video service provider (e.g., vspauth.zzz), or may be another authentication server such as a multiple service provider (MSP) authenticator. The MSP authenticator may be contracted by, may be a joint venture between, or may be some other entity having an affiliation with, multiple different video service providers as a central location for ad servers to verify the authentication of user equipment with different video service providers.

If authentication server 504 is hosted by the video service provider, then the authentication server 504 may send communication 503 in the same manner communication 302 is sent in the examples of FIGS. 3 and 4. If the authentication server 504 is not operated/controlled/hosted by the video service provider (e.g., a MSP authenticator), the authentication server 504 may: 1) determine which, if any, video service provider of multiple video service providers the user is a user of, or account holder with, based on the provided authentication data, and 2) if a customer, determines which video service options to provide to the third-party ad server 205. In one embodiment, the authentication server may have pre-acquired user data from one or more video service providers and stored such data in a database or other memory. In such an embodiment, the authentication server may determine whether the user equipment 201 is a user of a video service provider by comparing the authentication data to the stored pre-acquired user data in the database. The database may store data that indicates whether a user is a customer of a particular video service provider and may store the user's video service options by that video service provider. Alternatively, once the authentication server determines a particular user is a customer of a particular video service provider, the authentication server may then query that particular video service provider to determine that customer's video service options.

In another embodiment, the authentication server may query a particular video service provider based on the authentication data provided by the third-party ad server 205 a communication 505 (not shown), to determine whether the user is a customer of the video service provider and to acquire the video service options.

Once the authentication server 504 determines whether the user is a customer of a video service provider, and determines that user's video service options, the authentication server 504 completes the verification 215C by communicating the user's video service provider data to the third-party ad server 205 in a communication 503.

Figure 6:
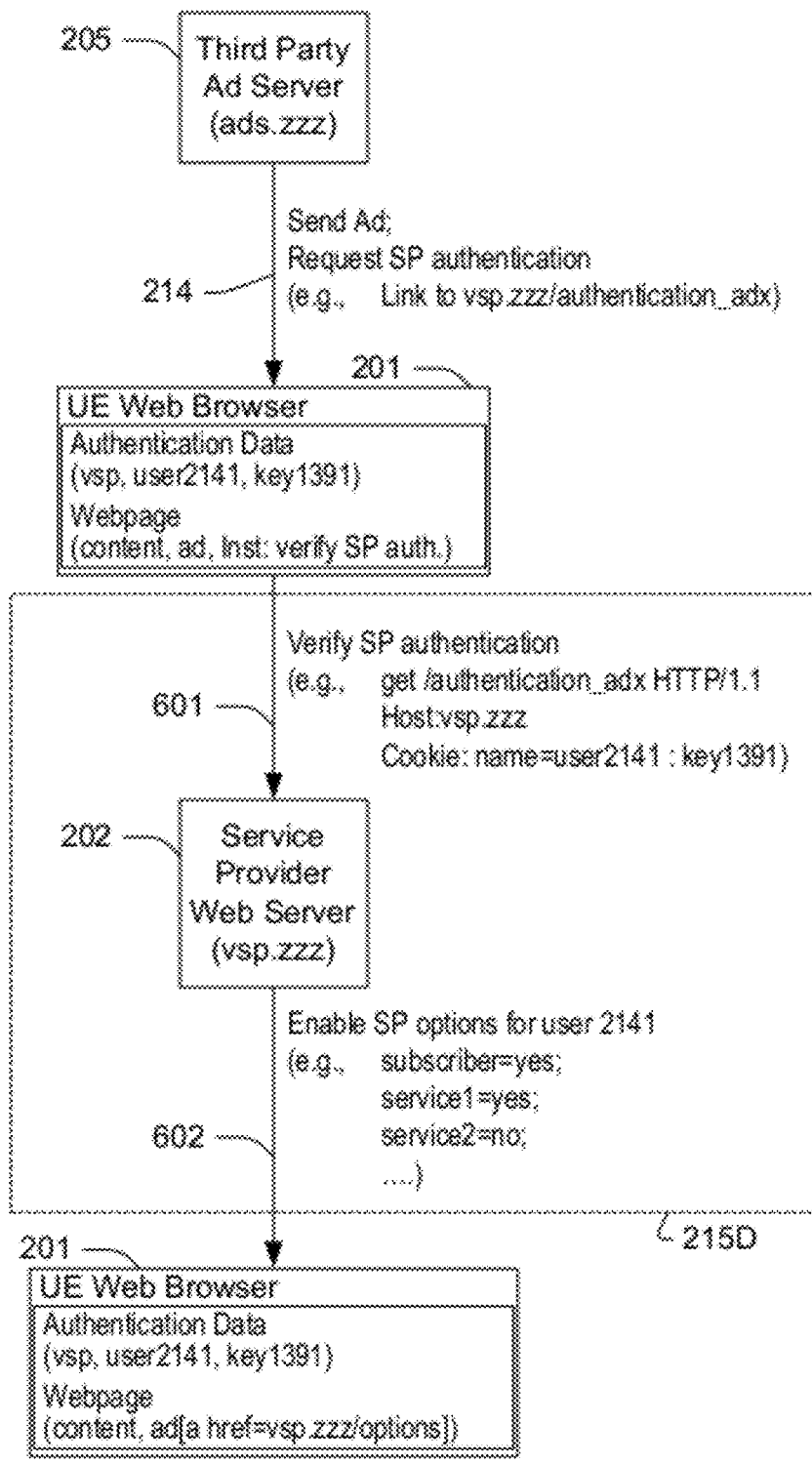

FIG. 6 illustrates another embodiment of the service provider authentication 215 (e.g., 215D) illustrated in FIG. 2, which also incorporates communication 216 of FIG. 2, sending the service provider options directly to the browser on user equipment 201. The verification 215D begins with the browser on user equipment 201 sending communication 601 to the video service provider web server 202. Communication 601 may be the same as those communications sent in the examples of FIGS. 3 and 4 (e.g., communications 301 and 401). In response to communication 601, the video service provider web server 202 authenticates the user equipment as a service provider customer (or determines that the user equipment has previously been authenticated as a service provider customer) (e.g., user2141), retrieves the customer's service provider service options from a database or other memory, and transmits those options in a communication 602 directly back to the browser on user equipment 201. In this example, the options are not sent to the third-party ad server 205 as in the examples of FIGS. 3 and 4. The browser on user equipment 201 may then modify the advertisement to incorporate those options.

In any of the above embodiments described with respect to FIGS. 3-6, the third-party ad server 205 and/or video service provider web server 202 may authenticate the user equipment 201 in a manner other than through a cookie or login information previously entered by the user. For example, the video service provider web server 202 (or other device) may detect the IP address of the user equipment 205 and compare the IP address to a list of IP addresses stored in a database to determine that the user equipment 201 IP address is within a range assigned to a particular video service provider who is also an internet service provider (ISP). From this comparison, the third-party ad server 205 or video service provider web server 202, and/or other equipment may automatically determine that the user of the internet service through user equipment 201 also subscribes to the video service. In another embodiment, the MAC address of user equipment 201 may be compared to a list of MAC addresses in a database, which has been determined to belong to a customer of the video service provider. The comparison of the IP address or MAC address, or other identifying information of the user equipment, may be performed by the video service provider web server 202, the third party server 205, or other intermediate device/server involved with the communications between the user equipment 201 and the network.

As a result of the various embodiments described above with respect to FIGS. 3-6, the browser on user equipment 201 may display the advertisement with interactive video service options specific to the user's account with the video service provider. Recall that one such option may for example be an interactive selection option that the user may choose, which automatically sets the user's DVR to record the show, series, subject matter, or other audiovisual content related to the advertisement. In response to a selection of the presented option in the advertisement, the browser on user equipment 201 sends a communication 217, which results in the remote control/programming of the user's DVR 206, via one or more commands 218 sent to DVR 206.

Figure 7:
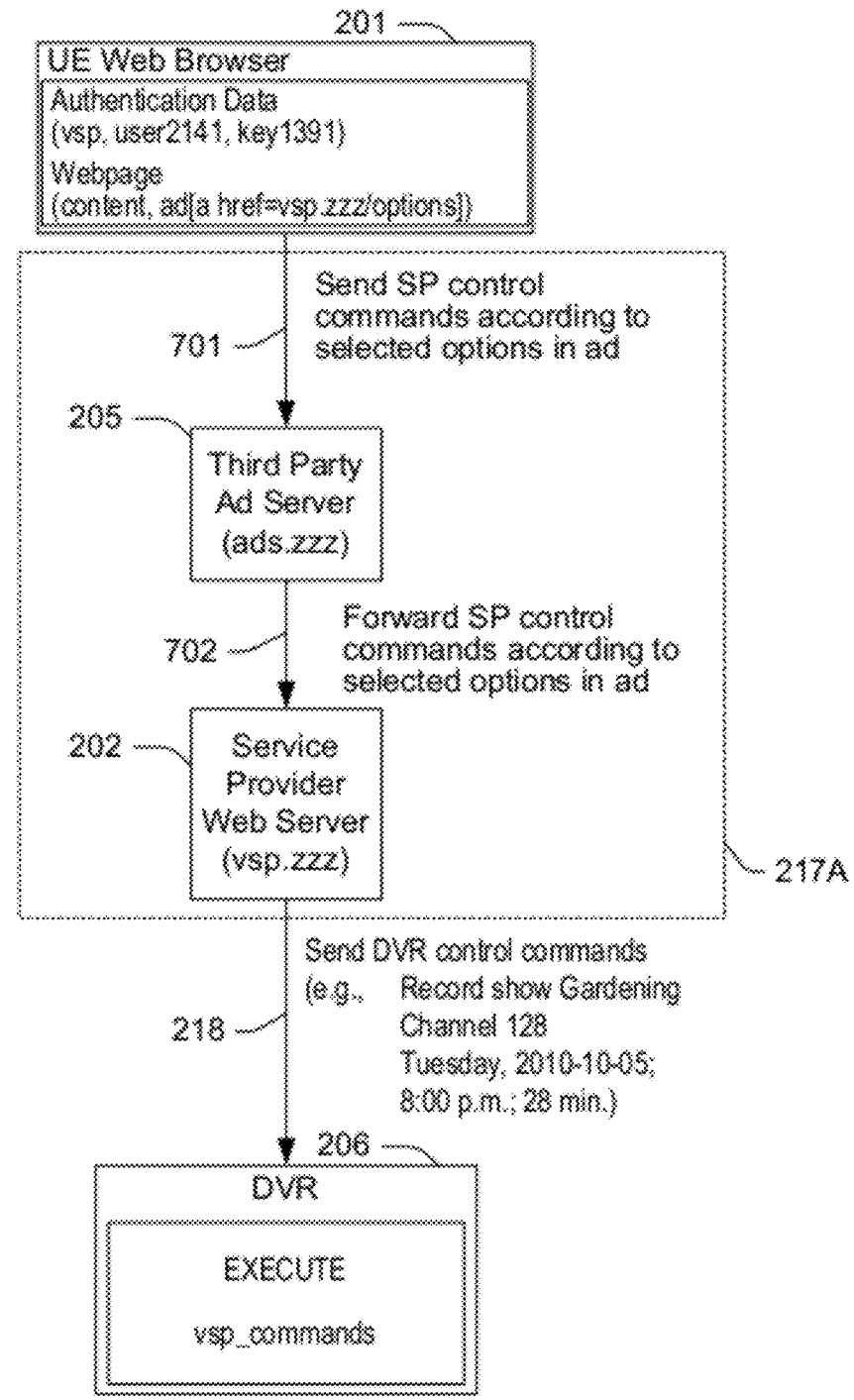
FIGS. 7-8 illustrate detailed flowcharts of a communication in FIG. 2 according to various illustrative embodiments.

FIG. 7 illustrates one embodiment of communication 217 (e.g., 217A) for configuring the user's video service options according to the user's selection of an interactive feature provided in advertisement 102. Communication 217 begins with the browser on user equipment 201 sending a communication 701 to the third-party ad server 205, which includes instructions for configuring the user's video service according to the selected option in the advertisement. For example, as illustrated in FIG. 1, advertisement 102 includes an interactive "record now" radio button which may be selected by the viewer. In response to the user clicking/selecting this radio button, the browser on user equipment 201 may send instructions to the third-party ad server 205 indicating that the user's DVR, identified through the user's video service provider account (i.e., user2141), should be programmed to record the advertised video series (e.g., "gardening" broadcast on a YXZ network). Alternatively, the instructions may indicate that a single episode, such as a pilot episode, be recorded.

In response to receiving these instructions in communication 701, the third-party ad server 205 forwards these instructions in communication 702 to the video service provider web server 202, or other designated server hosted by the video service provider. In one variation, the forwarded instructions in communication 702 may be exactly as received in communication 701. In a different variation, the forwarded instructions may be modified by the third-party ad server 205 to conform to a format decodable or executable by the server hosted by the video service provider to perform the desired function. For example, the communication 701 may provide only a single indication (e.g., "yes") to record the advertised series, and the third-party ad server 205 may include in communication 702, all additional information to identify the exact series (e.g., time, channel, series name, user account, etc.) to the video service provider 202. In another variation, communication 701 may be sent from the browser of user equipment 201 to the video service provider server 202, skipping third-party ad server 205 and communication 702 entirely.

In response to receiving the forwarded instructions, the video service provider 202 sends DVR control commands 218 to DVR 206 to remotely program the user's DVR 206. The DVR control commands may be sent, for example, through the video service provider's network (e.g., hybrid fiber-coax network), through a separate network connection (e.g., DSL network), through a private branch exchange (PBX) modem connection, through a wireless network, or by any other communication path as further described below with respect to FIG. 11

Figure 8:
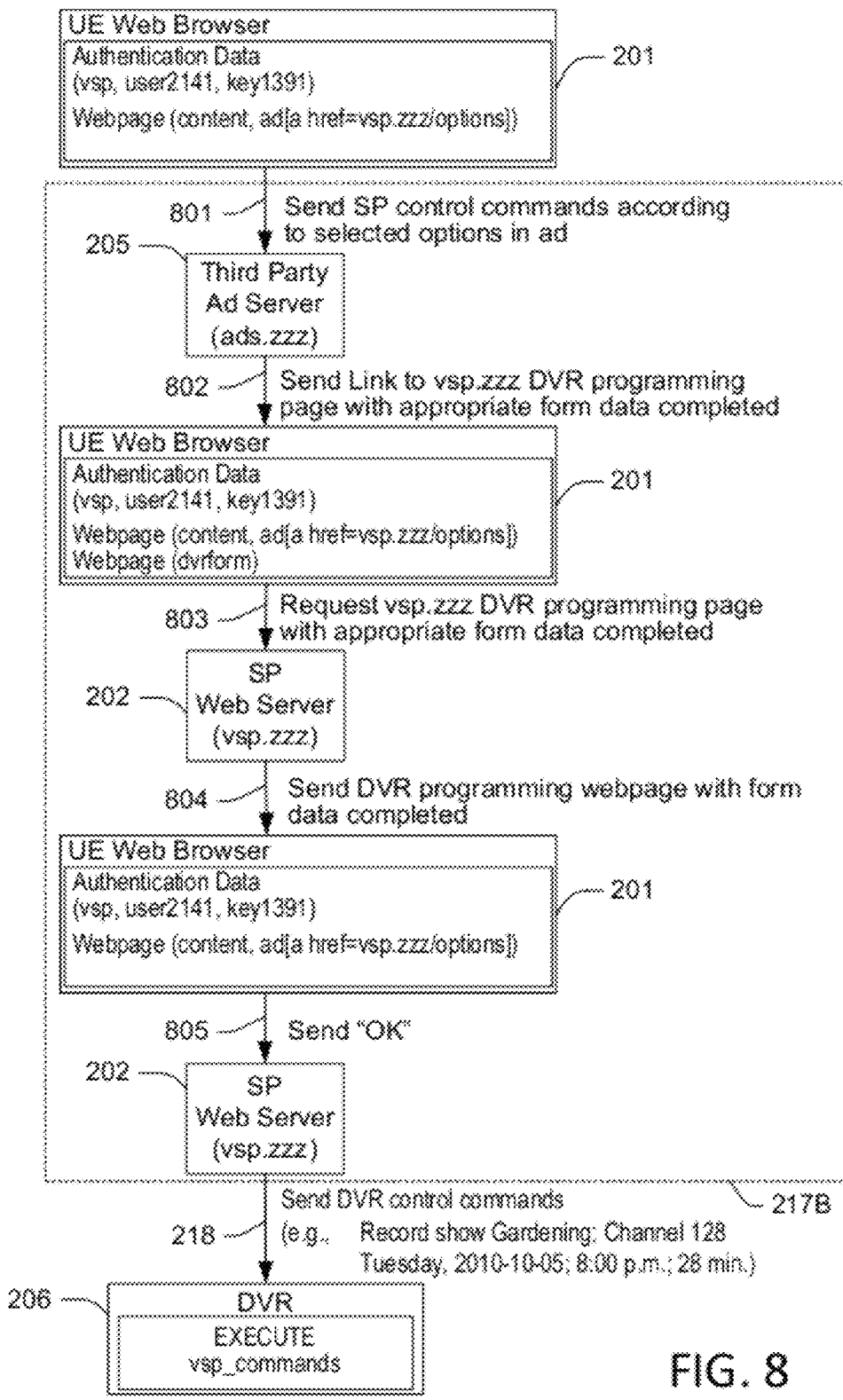

FIG. 8 illustrates another embodiment of communication 217 (e.g., 217B) for configuring the user's video service. Communication 217B begins in the same manner as communication 217A, with the browser on user equipment 201 sending communication 801 to the third-party ad server 205. Communication 801 includes instructions for configuring the user's video service based on the selected options in the advertisement. In response to receiving the instructions, the third-party ad server 205 replies to user equipment 201, with a communication 802, which includes a link to the video service provider's programming page for configuring the user's video service. The provided link and communication 802 may be accompanied by appropriate form data for entering into the video service provider's programming page for performing the video service (e.g., programming the user's DVR to record the advertised video series).

In response to receiving communication 802, the browser on user equipment 201 proceeds to send a request 803 for the webpage at the link provided in communication 802, and includes the additionally provided form data with the request. If the link is addressed to the same video service provider URL at which the user equipment 201 was authenticated in communication 208 of FIG. 2, request 803 for the webpage may also include the video service provider's cookie originally provided to the browser on user equipment 201. Alternatively or additionally, the request 803 may include any of the other previously discussed authentication data. In response to the request, the video service provider web server 202 responds by sending the requested webpage in a communication 804 to the browser on user equipment 201.

Figure 9:
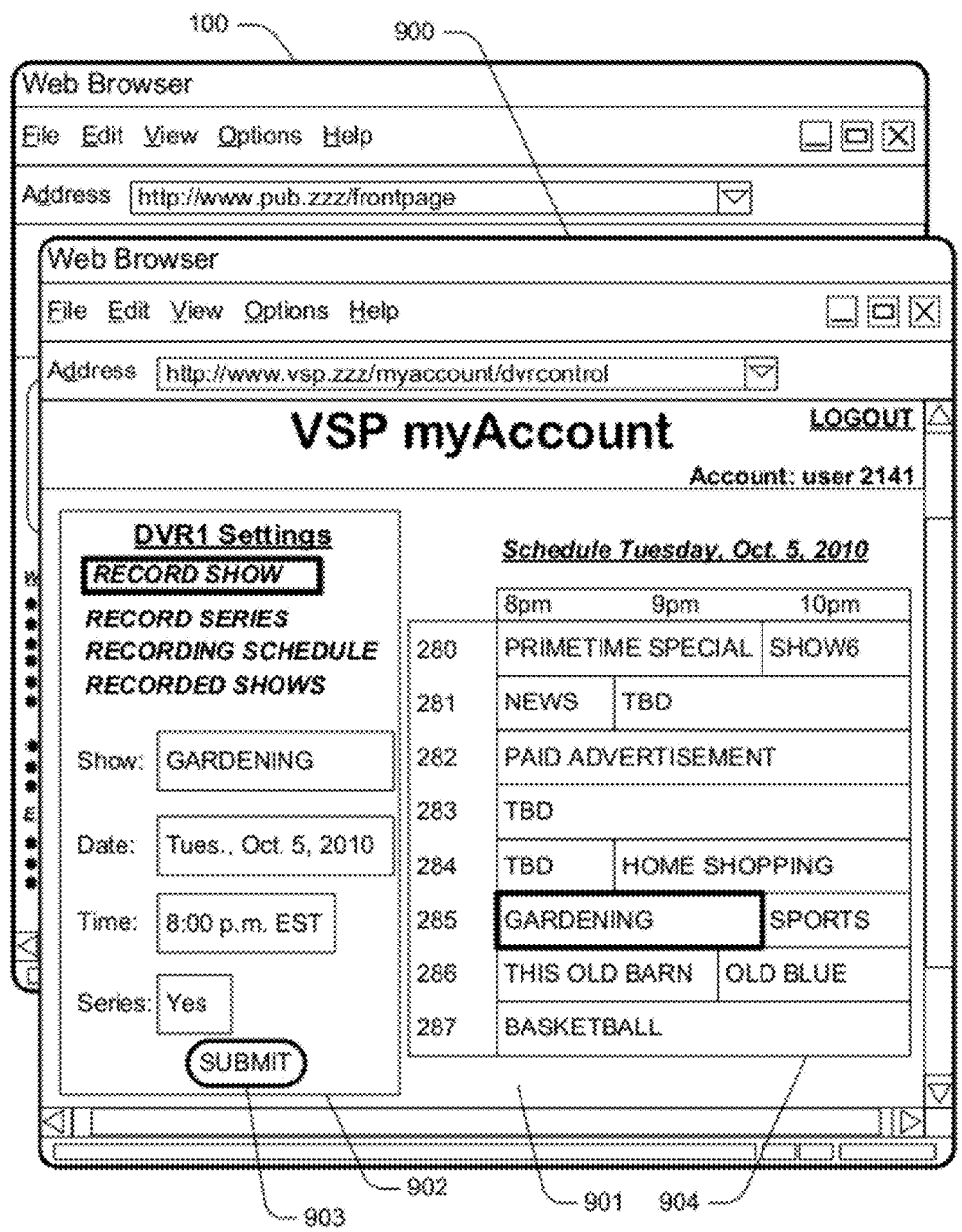
FIG. 9 illustrates a browser display according to at least one illustrative embodiment.

The requested webpage for the video service provider may be, for example, as shown in FIG. 9. FIG. 9 illustrates a webpage 901 titled "VSP myAccount", which the video service provider may provide to its customers for controlling the customer's account services. If the request 803 included the video service provider cookie or other authentication data, the user may automatically be logged in to the user's account (e.g., user2141). Alternatively, the user may be prompted to log into the account.

Once logged in, features and services provided by the video service provider to the user may be displayed. For example, the page 901 may include a frame 902 for remotely programming the customer's DVRs. The webpage may also include for example a programming schedule 904, which may be interactive and selectable for populating the form data in the DVR programming frame 902. The user for example may be able to browse programs within the schedule 904 and select a program (e.g., "gardening"), which causes the form data in 902 to be populated to specify the selected program. If form data that reflects the advertised video program is provided in communication 803 to the video service provider web server 202, the video service provider web server 202 may serve the webpage 901 with the DVR form data completely or partially pre-populated to specify the video program that was advertised in advertisement 102.

Once the form data is populated, the user may select a submit button 903 to trigger the execution of remote programming of the DVR. In response to this selection, the browser on user equipment 201 sends a selection in a communication 805 to the video service provider web server 202. Video service provider web server 202 then responds by sending communication 218 to remotely program the DVR in the same manner as described in FIG. 7.

Figure 10:
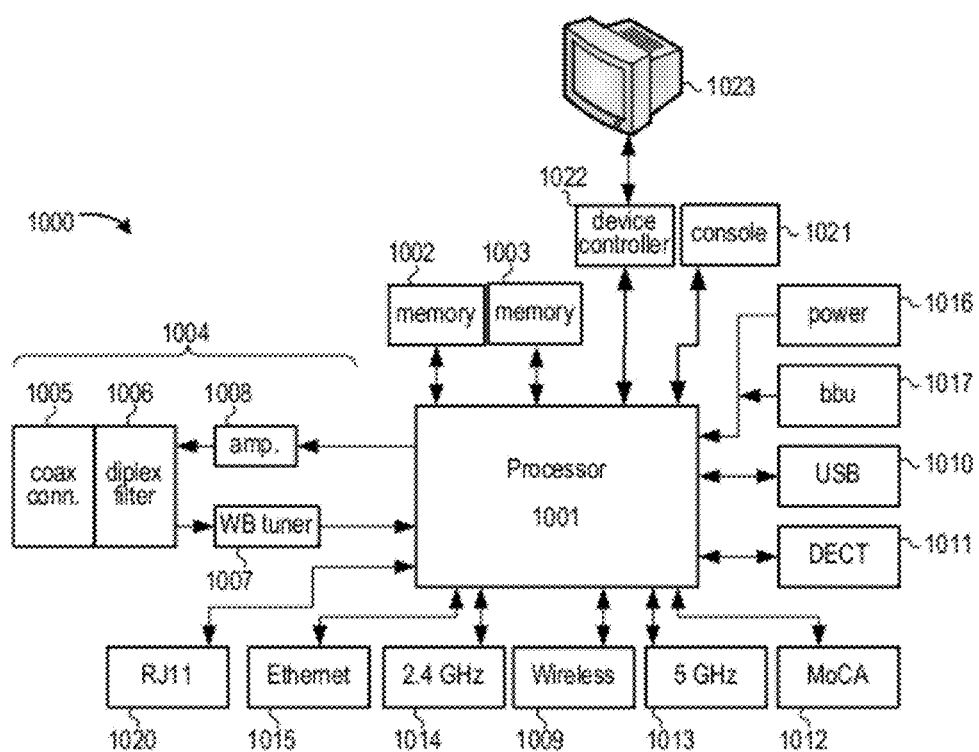
FIG. 10 is a schematic block diagram of a computing platform according to at least some illustrative embodiments.

FIG. 10 is a block diagram of equipment 1000 in which the various disclosed servers, user equipment, DVRs, and other described embodiments may be implemented. A main processor 1001 is configured to execute instructions, and to control operation of other components of equipment 1000. Processor 1001 may be implemented with any of numerous types of devices, including but not limited to, one or more general-purpose microprocessors, one or more application specific integrated circuits, one or more field programmable gate arrays, and combinations thereof. In at least some embodiments, processor 1001 carries out operations described herein according to machine readable instructions (e.g., software, firmware, etc.) stored in memory 1002 and 1003 and/or stored as hardwired logic gates within processor 1001. Processor 1001 may communicate with and control memory 1002 and 1003 and other components within 1000 over one or more buses.

Main processor 1001 may communicate with networks or other devices across one or more RF interfaces 1004 that may include a coaxial cable connector 1005, a diplex filter 1006, a wideband tuner 1007 and an upstream communication amplifier 1008. Main processor 1001 may also communicate with networks or other devices through additional wired and wireless interfaces, and various combinations thereof, which include additional hardware and/or firmware. Such interfaces may include one or more USB interfaces 1010, DECT 6.0 interfaces 1011, MOCA (Multimedia Over Coax) interfaces 1012, 2.4 GHz Wi-Fi interfaces 1014, 5 GHz Wi-Fi interfaces 1013, other wireless interfaces 1009, Ethernet interfaces 1015, RJ11 interfaces 1020, etc. A power supply 1016 and/or battery backup 1017 may provide electrical power. User input to equipment 1000 may be provided over one of the aforementioned interfaces or via a separate collection of buttons, infrared ports, or other controls in a console 1021. Equipment 1000 may include one or more output devices, such as a display 1023 (or an external television), and may include one or more output device controllers 1022, such as a video processor.

Memory 1002 and 1003 may include volatile and non-volatile memory and can include any of various types of tangible machine-readable storage medium, including one or more of the following types of storage devices: read only memory (ROM) modules, random access memory (RAM) modules, magnetic tape, magnetic discs (e.g., a fixed hard disk drive or a removable floppy disk), optical disk (e.g., a CD-ROM disc, a CD-RW disc, a DVD disc), flash memory, and EEPROM memory. As used herein (including the claims), a tangible machine-readable storage medium is a physical structure that can be touched by a human. A signal would not by itself constitute a tangible machine-readable storage medium, although other embodiments may include signals or other ephemeral versions of instructions executable by one or more processors to carry out one or more of the operations described herein.

In at least some embodiments, each of the servers, user equipment, and other equipment, which perform the various described processes, can be implemented as a single computing platform or multiple computing platforms, such as multiple equipment 1000, for redundancy and/or to increase the amount of analysis, data storage and other operations being performed simultaneously, or for convenience. Additionally, in various embodiments, multiple computing platforms may be configured to communicate over one or more networks to perform the various described processes of any single or multiple servers, user equipment or other equipment described above (e.g., cloud computing).

Figure 11:
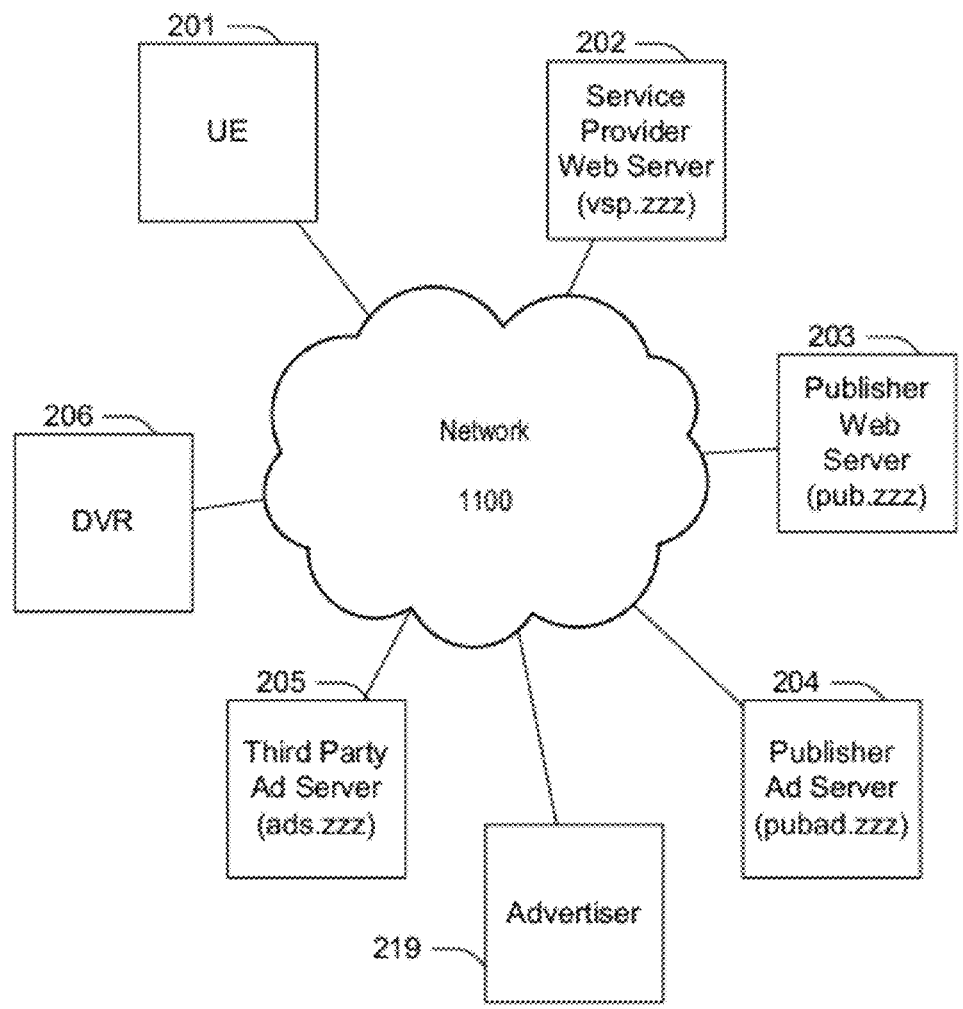
FIG. 11 shows an illustrative network diagram according to some illustrative embodiments.

In the various embodiments described above, the communications between the servers and other described equipment may be accomplished through a group of networks, which are represented by a cloud 1100 illustrated in FIG. 11. Network 1100 interconnects user equipment 201, video service provider web server 202, publisher web server 203, publisher ad server 204, third-party ad server 205, digital video recorder 206, advertiser 219, and other equipment described herein.

Network 1100 may include a single network or combination of networks, including one or more private or public, local or wide area, networks and in-home networks, which may be wired and/or wireless. Network 1100 may include, for example, coaxial, fiber, or hybrid fiber/coaxial distribution system (e.g., a DOCSIS network), digital subscriber line (DSL) network, a satellite communication network, any wireless network, and/or a PBX network, and combinations thereof.

Network 1100 may include a wide area wireless network providing mobile telephony and other types of mobile services to mobile user equipment, such as mobile telephones, "smart" phones, personal digital assistants (PDAs), laptops, electronic book readers, tablets, touchpad devices, and other types of wireless handheld devices. Examples of such wide area wireless networks include but are not limited to satellite and cellular telephone networks, 2G, 3G, 4G, etc. mobile networking and telecommunication networks, including CDMA, WCDMA, GSM, CDMA2000, TD-SCDMA, WiMAX, LTE solutions, EDGE (Enhanced Data rate for GSM Evolution) networks, EVDO (EVolution Data Optimized) networks, etc. Network 1100 may further include in-home and local networks, composed of but not limited to such technologies as Bluetooth networks, femto-cell technology, Digital Enhanced Cordless Telephone (DECT) networks, WiFi networks according to IEEE 802.11, Cordless Advanced Technology-Internet and Quality (CAT-iq) networks, etc, Ethernet networks, Multimedia Over Coax Alliance (MOCA) networks, Digital Living Network Alliance (DLNA) networks, etc.

While network cloud 1100 is illustrated as a central network through which all devices communicate, network cloud 1100 may comprise a number of separate networks, where only certain devices communicate with one another through a first network, while other devices communicate through a different network not connected to the first network. For example, publisher web server 203 and third-party ad server 205 may communicate directly through a satellite link with one another, while the video service provider web server 202 may communicate to DVR 206 through a separate hybrid coax-fiber network, which is unassociated with the satellite link.

The foregoing description of embodiments has been presented for purposes of illustration and description. The foregoing description is not intended to be exhaustive or to limit embodiments to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. All embodiments need not necessarily achieve all objects or advantages identified above. All permutations of various features described herein are within the scope of the invention.

For example, while various embodiments refer and are applicable to a video service (e.g., a DVR service), the disclosed embodiments may be applied to other services. For example, the disclosed embodiments may be applied to video-on-demand services, video game services, movie rental and purchase services, music rental, purchase, and streaming services, on-line merchandise stores, electronic book services, and other entertainment and merchandising services.

The invention claimed is:

1. A method comprising:
providing, from a server to a plurality of display devices, an advertisement for display in a plurality of different content pages hosted by a plurality of different publishers;
determining, at the server, that one or more display devices of the plurality of display devices is associated with one or more respective user accounts of a service provider that provides a service to each of the one or more respective user accounts; and
providing from the server to the one or more display devices, in response to the determining, a modification to the advertisement such that the advertisement, when modified by the modification, comprises an interactive control that when selected at each of the one or more display devices causes instructions to be sent to control the service for each of the one or more respective user accounts respectively.

2. The method of claim 1, wherein:
the service provider is a video service provider;
the service provided by the video service provider is a digital video recording service; and
the interactive control displayed in the advertisement, when selected, causes an automatic configuration of the digital video recording service to schedule a recording of a video program.

3. The method of claim 1, wherein:
for each of the one or more display devices determined to be associated with the one or more respective user accounts, the interactive control displayed in the advertisement, in response to being selected with only a single input by a user of that display device, causes the sending of the instructions to the service provider.

4. The method of claim 3, wherein:
the single input is a selection with a user-controlled pointer displayed over one of the plurality of different content pages on that display device.

5. The method of claim 3, wherein:
the interactive control displayed in the advertisement, in response to being selected with only the single input, causes an automatic configuration of the service without further input by a person.

6. A system comprising one or more processors and machine-readable media having stored thereon executable instructions, that when executed by the one or more processors, cause the system to:
provide, to a plurality of display devices located remotely from the system, an advertisement for display in a plurality of different content pages hosted by a plurality of different publishers;
determine that one or more display devices of the plurality of display devices are associated with one or more respective user accounts of a service provider that provides a service to each of the one or more respective user accounts; and
provide to the one or more display devices, in response to the determining that the one or more display devices are associated with the one or more respective user accounts, a modification to the advertisement such that the advertisement, when modified by the modification, comprises an interactive control that when selected at each of the one or more display devices causes instructions to be sent to control the service for each of the one or more respective user accounts.

7. The system of claim 6, wherein:
the service provider is a video service provider;
the service provided by the video service provider is a digital video recording service; and
the interactive control displayed in the advertisement, when selected, causes an automatic configuration of the digital video recording service to schedule a recording of a video program.

8. The system of claim 6, wherein:
for each of the one or more display devices determined to be associated with the one or more respective user accounts, the interactive control displayed in the advertisement, in response to being selected with only a single input by a user of that display device, causes the sending of the instructions to the service provider.

9. The system of claim 8, wherein:
the single input is a selection with a user-controlled pointer displayed over one of the plurality of different content pages on that display device.

10. The system of claim 8, wherein:
the interactive control displayed in the advertisement, in response to being selected with only the single input, causes an automatic configuration of the service without further input by a person.

11. A method comprising:
providing, to one or more third-party advertisement servers, from a service provider server, information associating a user device with a user account of the service provider;
providing an advertisement from the one or more third-party advertisement servers to the user device; and
receiving at the service provider server, server information indicating a selection of an interactive control in the advertisement and including instructions to configure a service provided to the user account associated with the user device.

12. The method of claim 11, wherein the service provider is a video service provider, the service is a digital video recording service provided by the video service provider, and the server information further identifies a video program; and wherein the method further comprises:
in response to receiving the server information, automatically configuring the digital video recording service to schedule a recording of the video program for the user account associated with the user device according to the instructions.

13. The method of claim 11, further comprising:
receiving the server information from the user device.

14. The method of claim 11, further comprising:
receiving the server information from the one or more third-party advertisement servers.

15. The method of claim 12, wherein:
the automatic configuring of the digital video recording service is performed without input by a person.

16. One or more non-transitory machine-readable media having stored thereon machine-executable instructions, that when executed by a processor in an apparatus, cause the apparatus to:
display an advertisement received from a first server in a content page received from a second server;
receive a first communication that is different from the advertisement and that includes information for modifying the advertisement to include an interactive control; and
send, in response to a selection of the interactive control, a second communication including commands for programming a service provided by a video service provider to a specific user account, wherein the modification is based on a previously determined association between the apparatus and the specific user account.

17. The one or more non-transitory machine-readable media of claim 16, wherein:
the machine-executable instructions, when executed, further cause the apparatus to send, to the first server, a third communication including information that identifies the apparatus as being associated with the specific user account.

18. The one or more non-transitory machine-readable media of claim 16, wherein:
the service is a digital video recording service;
the advertisement identifies a video program; and
the commands in the second communication direct the digital video recording service to schedule a recording of the video program for the specific user account.

19. The one or more non-transitory machine-readable media of claim 16, wherein:
the machine-executable instructions, when executed, further cause the apparatus to send the second communication in response to receiving both the first communication and the selection of the interactive control.

20. The one or more non-transitory machine-readable media of claim 19, wherein:
the selection of the interactive control is a single input by a user; and
the programming of the service provided to the specific user account is performed in response to the commands without input from a person.

* * * * *

UNITED STATES PATENT AND TRADEMARK OFFICE
CERTIFICATE OF CORRECTION

PATENT NO. : 9,607,302 B2  
APPLICATION NO. : 13/155940  
DATED : March 28, 2017  
INVENTOR(S) : Dixon et al.

Page 1 of 1

It is certified that error appears in the above-identified patent and that said Letters Patent is hereby corrected as shown below:

Page 2, Column 1, Other Publications, Line 5:  
Please delete "Eureopean" and insert --European--

Column 8, Detailed Description, Line 25:  
Delete "name=user2141 &key1391)." and insert --name=user2141&key1391).--

Column 9, Detailed Description, Line 36:  
Delete "205" and insert --201--

Signed and Sealed this  
Eighth Day of January, 2019

Andrei Iancu  
*Director of the United States Patent and Trademark Office*